No. 783,169. PATENTED FEB. 21, 1905.
D. F. BALL.
AUTOMATIC FISHING POLE.
APPLICATION FILED OCT. 28, 1904.
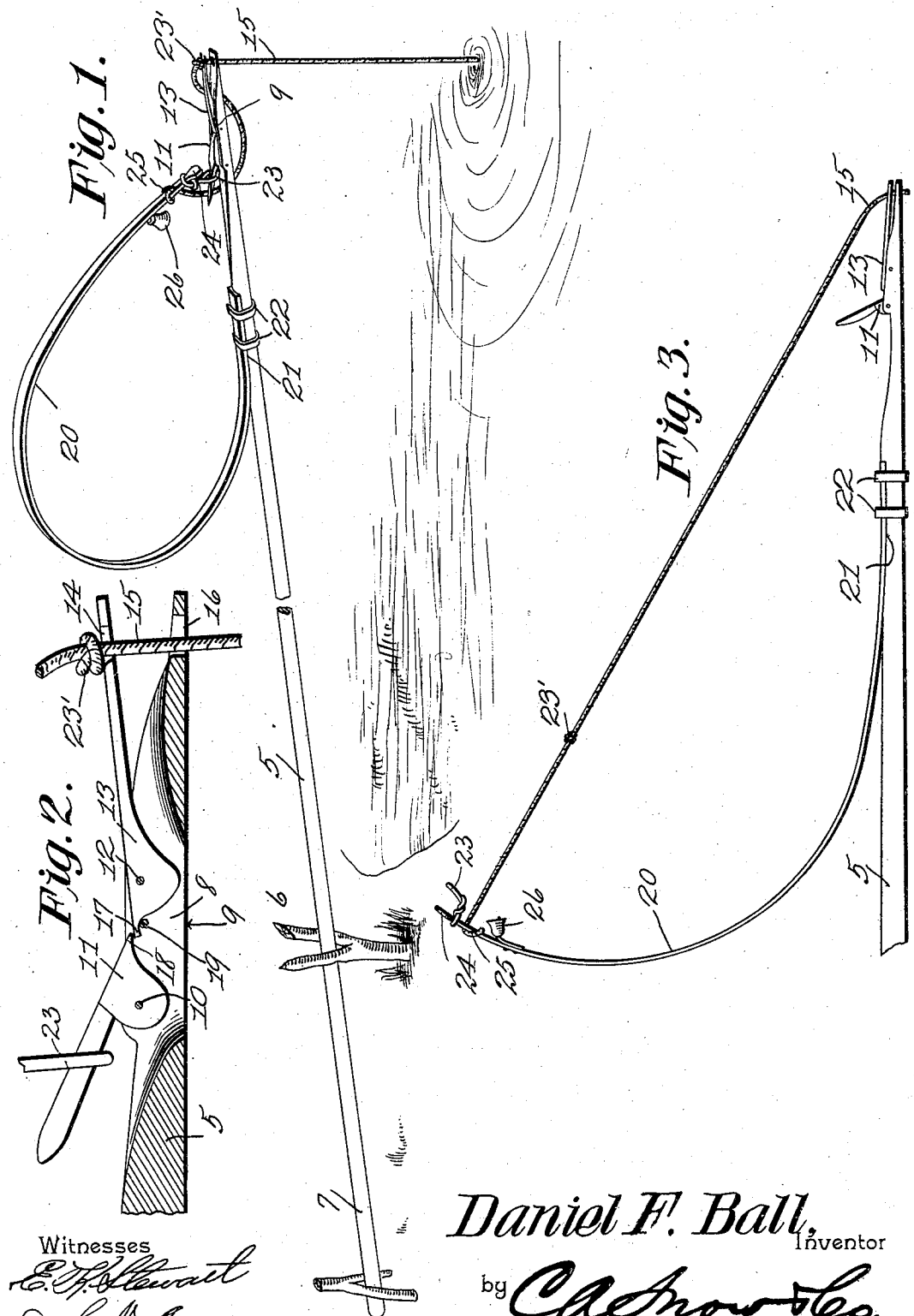
Witnesses
Daniel F. Ball, Inventor
by C. A. Snow & Co.
Attorneys No. 783,169. Patented February 21, 1905.

UNITED STATES PATENT OFFICE.

DANIEL FRANCIS BALL, OF JEFFERSONTON, VIRGINIA, ASSIGNOR OF ONE-FIFTH TO WALTER MARION HACKLEY, OF JEFFERSONTON, VIRGINIA.

AUTOMATIC FISHING-POLE.

SPECIFICATION forming part of Letters Patent No. 783,169, dated February 21, 1905.

Application filed October 28, 1904. Serial No. 230,423.

*To all whom it may concern:*

Be it known that I, DANIEL FRANCIS BALL, a citizen of the United States, residing at Jeffersonton, in the county of Culpeper and State of Virginia, have invented a new and useful Automatic Fishing-Pole, of which the following is a specification.

This invention relates to fishing-poles, and has for its object to provide a simple, inexpensive, and efficient device of this character which will automatically effect the setting of the hook in a fish's mouth when the bait on the hook is disturbed or snag a fish should it take the bait when placed above the hook.

A further object of the invention is to provide a signal for notifying the fisherman when the fish attempts to take the bait.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of the invention.

In the accompanying drawings, forming a part of this specification, Figure 1 is a perspective view of a fishing-pole constructed in accordance with my invention, showing the same set for use. Fig. 2 is an enlarged detail sectional view of Fig. 1. Fig. 3 is a side elevation showing the position of the several parts after the fish has taken the bait.

Similar numerals of reference indicate corresponding parts in all the figures of the drawings.

The fishing-rod 5, which may be of the usual or any preferred construction, may be either held in the hand when fishing or supported on a forked standard 6, driven or otherwise fastened in the ground, as clearly shown in Fig. 1 of the drawings. The end of the pole opposite the handle 7 is provided with a longitudinally-disposed slot or opening 8, defining a pair of vertical flanges 9, through which passes a pin or rod 10, acting as a pivot for a trigger-actuated lever 11.

Arranged in advance of the lever 11 and also mounted for pivotal movement on a rod 12, fastened in the flanges 9, is a trigger 13, the long end of which is bifurcated, as at 14, for the reception of the fishing-line 15, the latter being threaded through an eye or opening 16 in the end of the pole, as shown. The short end of the trigger 13 is extended to form a locking-lip 17, against which a similar lip 18 on the lever 11 is adapted to bear when the trigger is set, the downward movement of said trigger being prevented by engagement with a transverse pin 19, disposed beneath the locking-lip 17. The hook-setting member preferably consists of a flat spring 20, one end of which is seated in a recess 21 and secured to the pole in any suitable manner, as by clamping-bands or similar fastening devices 22, while the opposite end of the spring is normally flexed away from the pole, as shown in Fig. 3, and provided with a depending loop or eye 23, adapted to engage the long end of the lever 11. The free end of the spring is provided with a terminal enlargement 24, which serves to prevent longitudinal displacement of the loop 23 in one direction, while the end of the line, which is also secured to the free end of said spring, as indicated at 25, serves to prevent longitudinal movement of said loop in the opposite direction. A knot 23' is preferably formed in the line a short distance below the end of the spring 20, said knot being adapted to engage the bifurcated end of the trigger when the latter is set so that any downward pull exerted on the line will cause the knot to depress the trigger and release said spring.

As means for notifying the angler when a fish has taken the bait I secure a small bell or similar audible signal 26 to the end of the spring 20, so that the movement of the latter will set the bell into vibration, and thereby sound the alarm.

In practice the device is set by depressing the short end of the trigger until the locking-lip 17 engages the transverse pin 19 and subsequently bending the spring 20 and passing the depending loop or eye over the long end of the lever 11, the upward pressure exerted on said lever causing the lip to bear against the lip 17, and consequently elevate the long end of said trigger. The line is then drawn through the opening 16 until the knot 23' engages the bifurcation 14, in which position should a fish attempt to take the bait the downward pull on the line will spring the trigger and elevate the line sufficiently to effect the setting of the hook in the fish's mouth or snag the fish should it take the bait when placed above the hook.

It is obvious that any suitable signal may be substituted for the bell described and that a small button or similar device may be adjustably secured on the line instead of forming a knot in the latter, as shown.

Having thus described the invention, what is claimed is—

1. A device of the class described comprising a hook-setting member, a trigger, and a pivoted lever the short end of which engages the trigger and the long end thereof the hook-setting member.

2. A device of the class described comprising a hook-setting member, a trigger having one end thereof bifurcated, a pivoted lever engaging the trigger and setting member respectively and a line secured to the free end of the setting member and provided with means for engaging the bifurcated end of the trigger to thereby release the latter when a downward pull is exerted on the line.

3. A device of the class described comprising a hook-setting member, a trigger provided with a locking-lip, and a pivoted lever the short end of which engages the locking-lip of the trigger and the long end thereof the setting member.

4. A device of the class described comprising a pole provided with a longitudinal slot, a trigger pivotally mounted in said slot, a lever one end of which engages the trigger for locking the latter in set position, and a hook-setting member having one end thereof secured to the pole and its free end engaging the opposite end of said lever.

5. A device of the class described comprising a pole, a trigger, a pivoted lever one end of which engages the trigger for locking the latter in set position, a hook-setting member having one end thereof secured to the pole, and means carried by the free end of the setting member for engaging the opposite end of said lever.

6. A device of the class described comprising a pole, a trigger, a pivoted lever one end of which engages the trigger for locking the same in set position, a spring having one end thereof secured to the pole, and a depending loop or eye secured to the free end of the spring and adapted to engage the opposite end of said lever.

7. A device of the class described comprising a pole provided with a terminal opening and having a longitudinal slot formed therein adjacent said opening, a trigger pivoted in said slot and provided with a terminal bifurcation adapted to register with the opening in the pole, a lever also pivoted in said slot and adapted to engage the trigger for locking the latter in set position, and a spring secured by one end to the pole and having its free end provided with means for engaging the free end of said lever.

8. A device of the class described comprising a pole, a trigger, a pivoted lever one end of which is adapted to engage the trigger for locking the latter in set position, a spring secured by one end to the pole and having its free end provided with means for engaging the opposite end of said lever, and a signal carried by the spring and operable by the movement of the latter.

9. A device of the class described comprising a pole provided with a longitudinal slot, a trigger pivoted in said slot, a transverse pin for limiting the downward movement of the trigger, a lever for forcing the end of the trigger in engagement with said pin, and a spring secured to the pole and adapted to engage said lever.

In testimony that I claim the foregoing as my own I have hereto affixed my signature in the presence of two witnesses.

DANIEL FRANCIS BALL.

Witnesses:
BESSIE B. MACKALL,
W. I. GILKESON.